Figure 3:
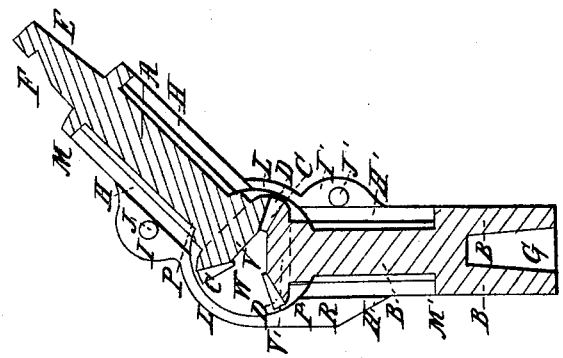
Figure 2:
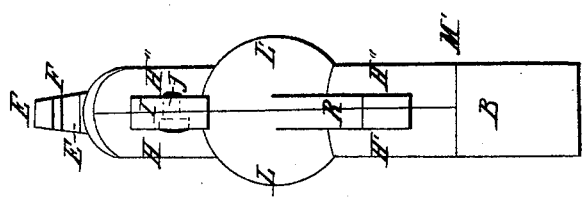
Figure 1:
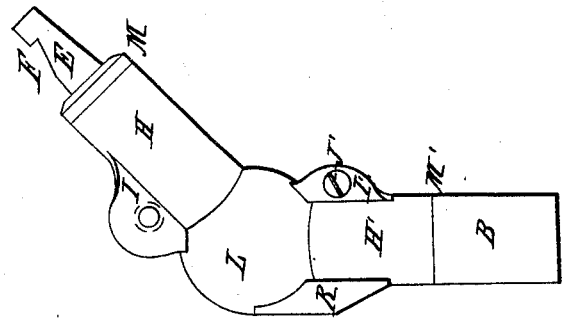

Hill & Adams,
Bit Stock.

Nº 19,028. Patented Jan. 5, 1858.

Witnesses:

Inventors:
Benjamin B Hill
Saml W. Adams

UNITED STATES PATENT OFFICE.

B. B. HILL AND S. W. ADAMS, OF CHICOPEE, MASSACHUSETTS.

BIT-HOLDER.

Specification of Letters Patent No. 19,028, dated January 5, 1858.

*To all whom it may concern:*

Be it known that we, BENJAMIN B. HILL and SAMUEL W. ADAMS, of Chicopee, in the county of Hampden and State of Massachusetts, have invented an Improvement in Bit-Holders; and we do hereby declare that the following is a full and exact description thereof, reference being had to the accompanying drawings and to the letters and figures marked thereon.

Figure I is an elevation, showing the exterior form of the instrument. Fig. II, exterior view of the back of the same. Fig. III, longitudinal section through the center of the instrument.

This bit-holder is intended to be used for boring holes near to the walls of a room or in a corner, and in many places where holes cannot be made by the straight bit or auger when used in the common bit-stock.

Letters Patent of the United States have been granted for diagonal bit-holders in which a universal joint or beveled gears are used, and our improvement does not relate to these parts of the instrument, but consists mainly in the mode of making the two bearings and connecting them with each other by means of the globular casing which incloses the beveled gears.

The upper end of the tool is tapered at E, so as to fit into the common bit-stock, to which it is secured by the spring or catch that enters the notch F; this tapered end forms a part of the main shaft or bearing A, which has a collar or projection M, near one end, and at the other a beveled gear V, having teeth C, and just back of the gear a collar P. The lower bearing or shaft B, is placed at an angle of about one hundred and thirty-five degrees with the corresponding shaft A, and has at its lower end a tapered socket G of suitable size to receive the shank of the bit or auger; this end is enlarged to give strength around the socket, and as the part B that constitutes the bearing is made of less diameter it forms a square shoulder at M'. At the upper end of this shaft B, there is a beveled gear V' with a shoulder P' and teeth D which are so fitted as to act against the teeth C upon one side of the axis of rotation, at C, D. To retain the above described shafts in their proper position we construct the combined boxes, casing and guard as hereinafter described. The casing is made in two pieces, which, when the tool is laid in a horizontal position may be termed the upper and lower boxes; thus, in Fig. II, H L H' represents the upper box, and H'' L' H''' the lower one, the exterior form being circular, and each piece making half of the circle, the edges of the two pieces being fitted to each other and held firmly in place by the screws J J', which pass through the projecting ears, I I', formed upon opposite sides of the casing. The "rest" R, for which patent has been granted to B. B. Hill, one of the present applicants, is made upon both of the pieces of the casing, which when placed in contact form a flat surface or plane having the division line at the center. The relative position of the shaft and interior of the casing is shown in Fig. III; the shafts A and B rest in the boxes H and H', which boxes are connected to each other by the globular casing L, the interior, W, being a spherical cavity, within which the beveled gears revolve, and provided with suitable shoulders to retain the gears in a proper position with reference to each other.

By this arrangement and combination of the parts the tool is made in four pieces, strong and well fitted bearings are secured and the chips and fragments of wood, made by the auger or bit cannot fall into or clog the beveled gears. When in use the bit is placed in the socket G, the stock is attached at E, and the casing is held in a fixed position with one hand while the brace or bit-stock is turned with the other.

What we claim and desire to secure by Letters Patent is—

The combination of the two boxes or bearings, placed at any required angle with each other, with the intervening globular connection which forms a casing for the beveled gears.

BENJAMIN B. HILL. [L. S.]
SAML. W. ADAMS. [L. S.]

In presence of—
AMORY DOOLITTLE,
MAX S. G. WILDE.